April 6, 1965  W. SCHMIDT  3,177,353
MOUNTING DEVICE FOR ELECTRONIC FLASH UNITS
Filed Nov. 6, 1961

Inventor:

United States Patent Office

3,177,353
Patented Apr. 6, 1965

3,177,353
MOUNTING DEVICE FOR ELECTRONIC
FLASH UNITS
Walter Schmidt, Berlin-Lichterfelde, Germany, assignor to Loewe Opta Aktiengesellschaft, Berlin, Germany, a company of Germany
Filed Nov. 6, 1961, Ser. No. 150,589
Claims priority, application Germany, Nov. 9, 1960, L 37,476
3 Claims. (Cl. 240—1.3)

The present invention is directed to a device for mounting electronic flash units on the camera. It is the object of the invention to attach the mounting device to the casing of the flash unit in such a manner that it interferes as little as possible while at rest or when moving the instrument.

As is known, the electronic flash instruments are inserted on an insertion jaw on the camera by means of a support acting as a holding device which is fastened to the casing thus holding it on the camera. This holding support on the flash unit protrudes from the case, and therefore interferes during transportation and when storing the equipment in a bag.

This disadvantage is eliminated by this invention. The essential characteristic of the present invention consists in that the holding device for mounting the electronic flash unit on the camera is attached to the casing of the flash unit capable of being recessed or submerged into the latter.

This makes it possible, when at rest or during transportation to let the holding or mounting device disappear inside the casing.

For accomplishing this inventive idea the mounting element is rotatable around a pivot and, furthermore, is held to the casing incapable of being lost. Moreover, the mounting element is suitably constructed in angular shape.

In addition, according to the invention the mounting element in its position extending through an opening in the casing can be arranged in such a manner that it is able to slide laterally parallel to itself in such a way that the distance between reflector axis and objective (lens) axis of the pertinent camera is enlarged. Because of this enlarged distance between reflector axis and camera objective axis an improvement of the lighting effect by shade formation will be achieved.

This advantageous effect can be increased further by arranging the reflector opening asymmetrically in the casing of the flash unit. The above-mentioned lateral sliding-capacity of the holding device has two advantages: firstly, as mentioned before, the distance between the central axis of the reflector and that of the objective will be enlarged and, secondly, the reading of the scale divisions on the objective tube will be easier and "more accurate because the flash unit casing cannot block the view from above onto the objective."

According to a further subject matter of the invention, provision is made that the mounting element activates a switch contact during its pivoting or folding movement so that the flash unit during the movement of the mounting element into the casing is switched off from its energy source. This can be simply achieved in that, when the mounting device is swinging back, it lifts a contact spring from a contact set, thereby interrupting the electric contact.

In a two-piece flash unit the mounting device can be recessed or submerged into the reflector unit.

In addition, for improving the location of the center of gravity at the flash unit attached to the camera, it will be of advantage to arrange the individual parts located inside the casing of the flash unit according to their specific weight in such a manner that the specifically heavy parts lie on the side of the mounting device for fastening the flash unit to the camera.

The invention shall be explained in detail by way of the accompanying drawing showing an exemplary embodiment of the invention:

Figures 1, 2:
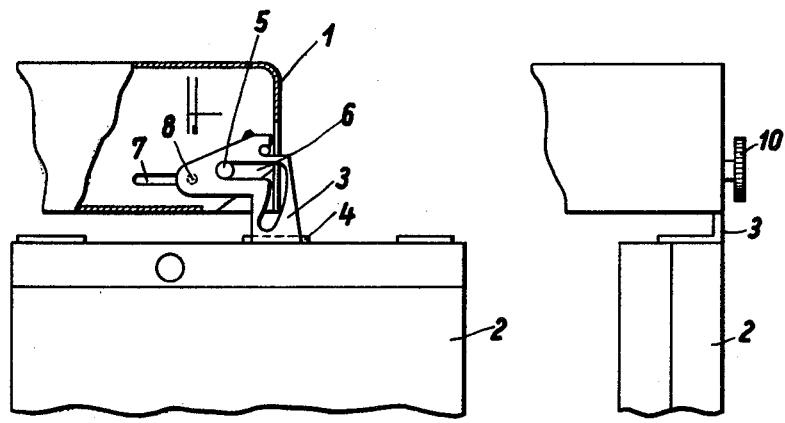
FIG. 1 shows a main view of the flash unit for example in one part with the mounting device attached to the camera according to the invention.
FIG. 2 shows the side-view of this.

In FIG. 1 the casing of the flash unit is numbered by numeral 1 which is attached, by means of the mounting device 3, to the slide shoe 4 fixed on the camera 2. The mounting device 3 (see also FIG. 2) of angular shape can be shifted in lateral direction by means of pin 5 and slot 6 and, is furthermore, rotatable around pivot 8 guided by slot 7; therefore, when sliding member 3 by pivoting upwards can be recessed or submerged into the casing 1 of the flash unit.

Figure 3:
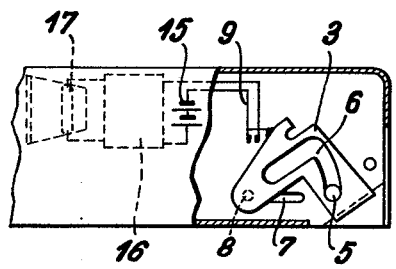
FIG. 3 shows a partial section of the casing of the flash unit with the mounting device recessed or submerged into the casing and the electrical contact set belonging to it for switching off the energy source.

This recessed position of member 3 is shown in FIG. 3. One can see that pivot 8 lies at the outermost left end of slot 7 and that, furthermore, member 3 has been pivoted upwards around this pivot 8 whereby pin 5 now rests against the lower right end of guiding slot 6. One can also see that member 3, in this recessed position, has interrupted the set of electric switch springs 9 and has thereby switched off the energy circuit of the flash unit which is connected with these contact springs 9, consisting of battery 15, flash producing means 16, and flash lamp 17 located within the reflector 18. In this way, the rotating back motion of the mounting device 3 into the casing of the flash unit automatically, at any rate, switches off the energy source of the flash unit when the latter is detached from the camera.

In FIG. 2 the angular shape of the mounting member 3 can be recognized. The purpose of screw 10 is the clamping of mounting device 3 in its swing-out position.

Figure 4:
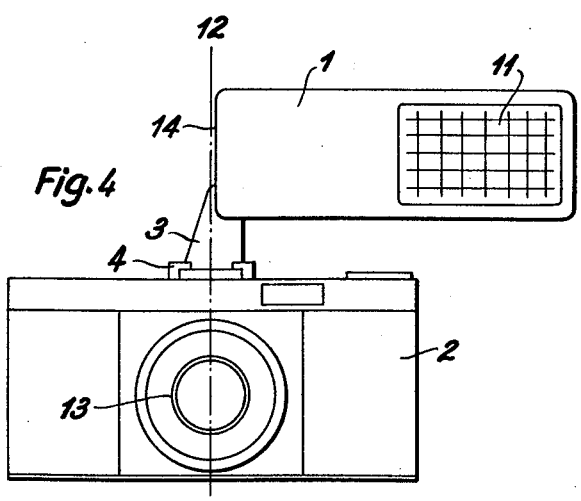
FIG. 4 represents the front view of a camera with attached flash unit showing the asymmetrical arrangement of the reflector opening with respect to the casing of the flash unit and also with respect to the slide shoe of the camera.

FIG. 4 shows the asymmetrical arrangement of the reflector opening 11 within the casing 1 of the flash unit. This casing 1 of the flash unit is inserted, by means of the mounting device 3, which is rotatable according to the invention into the slide shoe 4 of the camera 2. The asymmetrical arrangement of the reflector opening 11 allows the maximal distance between the centre axis of the reflector opening 11 and the axis 12 of the camera objective 13.

To improve the location of the centre of gravity of the unit camera casing of the flash unit it will be of advantage to arrange the specifically heavy individual parts of the flash unit within the casing 1 towards the wall 14 of casing 1. This makes an easier handling of the camera united with the flash unit possible.

What I claim is:

1. A flash unit for photographic purposes, comprising a hollow casing enclosing a reflector, a flash lamp in the reflector, electrical means in circuit with said flash lamp for producing a flash of light in the flash lamp, a device for mounting the flash unit as a whole on a camera, an opening in the bottom corner of said casing, a pin fixed to the interior of the casing adjacent said opening, and a slot within the casing, said mounting device extending through said opening in the casing being supplied with another slot and a pivot fixed to its one end, said pin being guided in this slot of said mounting device, and said pivot being guided in said slot within the casing, said mounting device being rotatable around said pivot to be moved in a recessed position within said casing, said casing having a flat form of rectangular shape, and said reflector being asymmetrically arranged within one of the side walls of said casing.

2. A flash unit for photographic purposes, comprising a hollow casing enclosing a reflector, a flash lamp in the reflector, electrical means in circuit with said flash lamp for producing a flash of light in the flash lamp, a device for mounting the flash unit as a whole on a camera, an opening in the bottom corner of said casing, a pin fixed to the interior of the casing adjacent said opening, and a slot within the casing, said mounting device extending through said opening in the casing being supplied with another slot and a pivot fixed to its one end, said pin being guided in this slot of said mounting device, and said pivot being guided in said slot within the casing, said mounting device being rotatable around said pivot to be moved in a recessed position within said casing.

3. A flash unit for photographic purposes, comprising a hollow casing enclosing a reflector, a flash lamp in the reflector, electrical means in circuit with said flash lamp for producing a flash of light in the flash lamp, a device for mounting the flash unit as a whole on a camera, an opening in the bottom corner of said casing, a pin fixed to the interior of the casing adjacent said opening, a slot within the casing, and electrical connecting switch springs in circuit with said flash lamp and said electrical means within the casing adjacent said opening, said mounting device extending through said opening in the casing being supplied with another slot and a pivot fixed to its one end, said pivot being guided in said slot within the casing, said pin being guided in this slot of said mounting device, said electrical connecting switch springs being moved to open circuit position when said mounting device engages one of said springs upon movement to the recessed position within the casing and being biased to closed circuit position when the mounting device is rotated out of the casing through said opening.

References Cited by the Examiner
UNITED STATES PATENTS

| | | | |
|---|---|---|---|
| 2,688,071 | 8/54 | Wright | 240—1.3 |
| 2,831,412 | 4/58 | Friedman | 95—11.55 |
| 2,898,448 | 8/58 | Smith | 240—1.3 |
| 3,018,707 | 1/62 | Whittier | 240—1.3 X |

FOREIGN PATENTS 1,090,958  10/60  Germany.

NORTON ANSHER, *Primary Examiner.*